(12) United States Patent
Hauser

(10) Patent No.: US 7,186,200 B1
(45) Date of Patent: Mar. 6, 2007

(54) PLANET BRAKE DIFFERENTIAL

(75) Inventor: Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 147 days.

(21) Appl. No.: 10/965,259

(22) Filed: Oct. 14, 2004

(51) Int. Cl.
*F16H 48/06* (2006.01)
*F16H 48/20* (2006.01)

(52) U.S. Cl. .................. 475/220; 224/249; 224/29; 192/48.91

(58) Field of Classification Search ............. 475/220, 475/223, 311, 332, 900, 298–300; 188/72.7, 188/85; 192/48.91, 19
See application file for complete search history.

(56) References Cited

U.S. PATENT DOCUMENTS

| | | | |
|---|---|---|---|
| 1,734,718 A | | 11/1929 | Donald |
| 2,684,740 A | | 7/1954 | Mader |
| 2,946,239 A | * | 7/1960 | Hait ............................ 475/27 |
| 3,119,281 A | * | 1/1964 | Gerber et al. .......... 74/665 GB |
| 3,581,600 A | | 6/1971 | Holdeman |
| 3,949,848 A | * | 4/1976 | Fogelber ...................... 192/38 |
| 3,966,005 A | | 6/1976 | Binger |
| 3,969,958 A | | 7/1976 | Miyao et al. |
| 4,667,784 A | * | 5/1987 | Cronin ....................... 192/221 |
| 4,879,867 A | | 11/1989 | Wenzel |
| 4,895,210 A | | 1/1990 | Witzel |
| 4,920,734 A | | 5/1990 | Wenzel |
| 5,012,907 A | | 5/1991 | Fujioka et al. |
| 5,083,993 A | * | 1/1992 | Oun ........................... 475/299 |
| 5,427,217 A | | 6/1995 | Patridge |
| 6,354,978 B1 | | 3/2002 | Brackin et al. |
| 6,419,035 B1 | | 7/2002 | Plamper |
| 6,571,894 B2 | | 6/2003 | Ishimaru et al. |
| 6,702,701 B2 | | 3/2004 | Phelan et al. |

* cited by examiner

*Primary Examiner*—Tisha Lewis
(74) *Attorney, Agent, or Firm*—Neal, Gerber & Eisenberg LLP

(57) ABSTRACT

An embodiment of the present invention involves a drive apparatus with a housing, a first and second axle mounted in the housing and a ring gear located within the housing. A brake clutch assembly is located on each axle with a planetary gear arrangement, a drive plate engaged to the planetary gear arrangement, a brake plate mounted on the corresponding axle and an engagement assembly disposed about the drive plate and the brake plate. The engagement assembly is used to selectively engage the drive plate or the brake plate.

21 Claims, 6 Drawing Sheets

PLANET BRAKE DIFFERENTIAL

BACKGROUND OF THE INVENTION

This invention relates to the use of a planet gear system to brake and drive a vehicle.

SUMMARY OF THE INVENTION

A planet brake differential is described herein. The details of the invention are set forth below in connection with the detailed description of the embodiments.

DETAILED DESCRIPTION OF DRAWINGS

Figure 1:
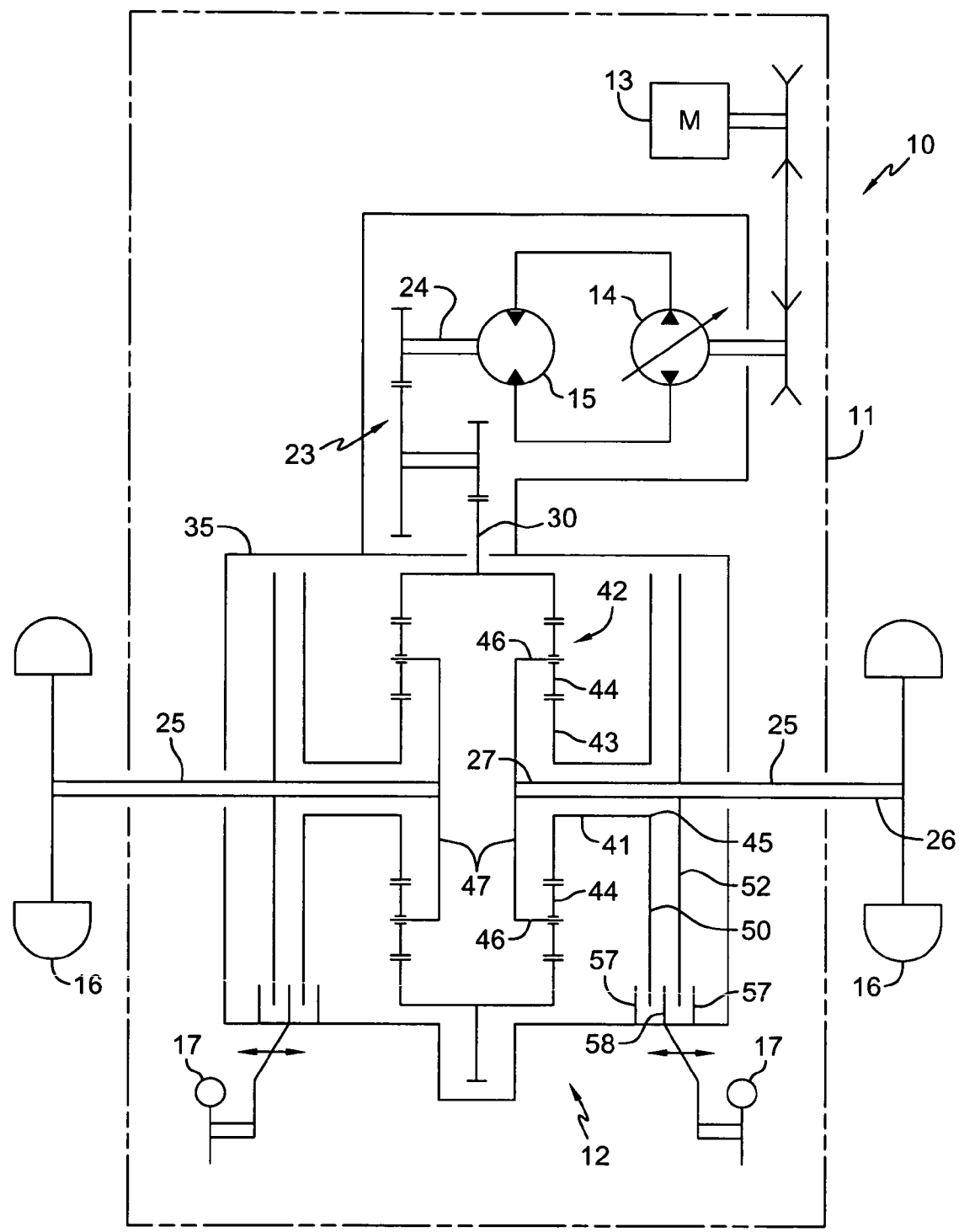
FIG. 1 depicts a schematic of an exemplary vehicle comprising an embodiment of the present invention.

FIG. 1 depicts a schematic of an exemplary vehicle 10 comprising an embodiment of the present invention. Vehicle 10 has a frame 11 on which planet brake differential 12 is mounted. As the configuration of vehicle 10 is well known in the art, it will only generally be described herein. Prime mover 13 is mounted on frame 11 and drives hydraulic pump 14 which is hydraulically connected to and drives hydraulic motor 15. Motor 15 is in turn drivingly engaged to planet brake differential 12. Planet brake differential 12 is drivingly engaged to wheels 16 through a pair of axles 25. Control handles 17 are also mounted to frame 11. It will be understood by one in the art that FIG. 1 depicts a schematic of an exemplary embodiment rather than a limiting one. Planet brake differential 12 has many applications and is not limited to applications such as vehicle 10, nor is it limited to use with vehicles, as there are industrial applications for such units. Neither is planet brake differential 12 limited to applications in hydraulic or hydrostatic devices as other drive systems may be used, such as one using a clutch to select a gear or a variable speed transmission ("VST").

Figure 2:
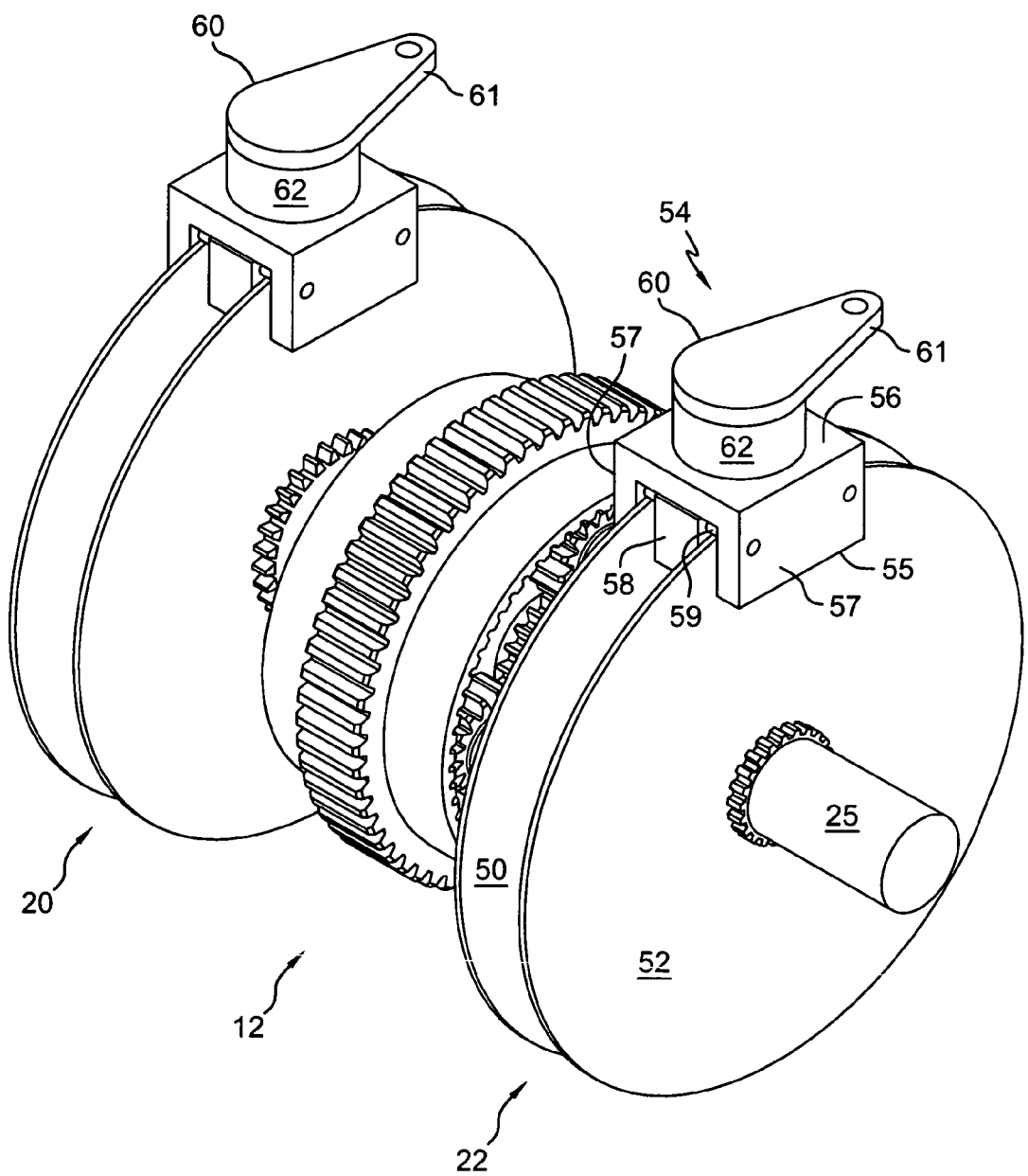
FIG. 2 depicts a perspective view of an embodiment of the present invention.
Figure 3:
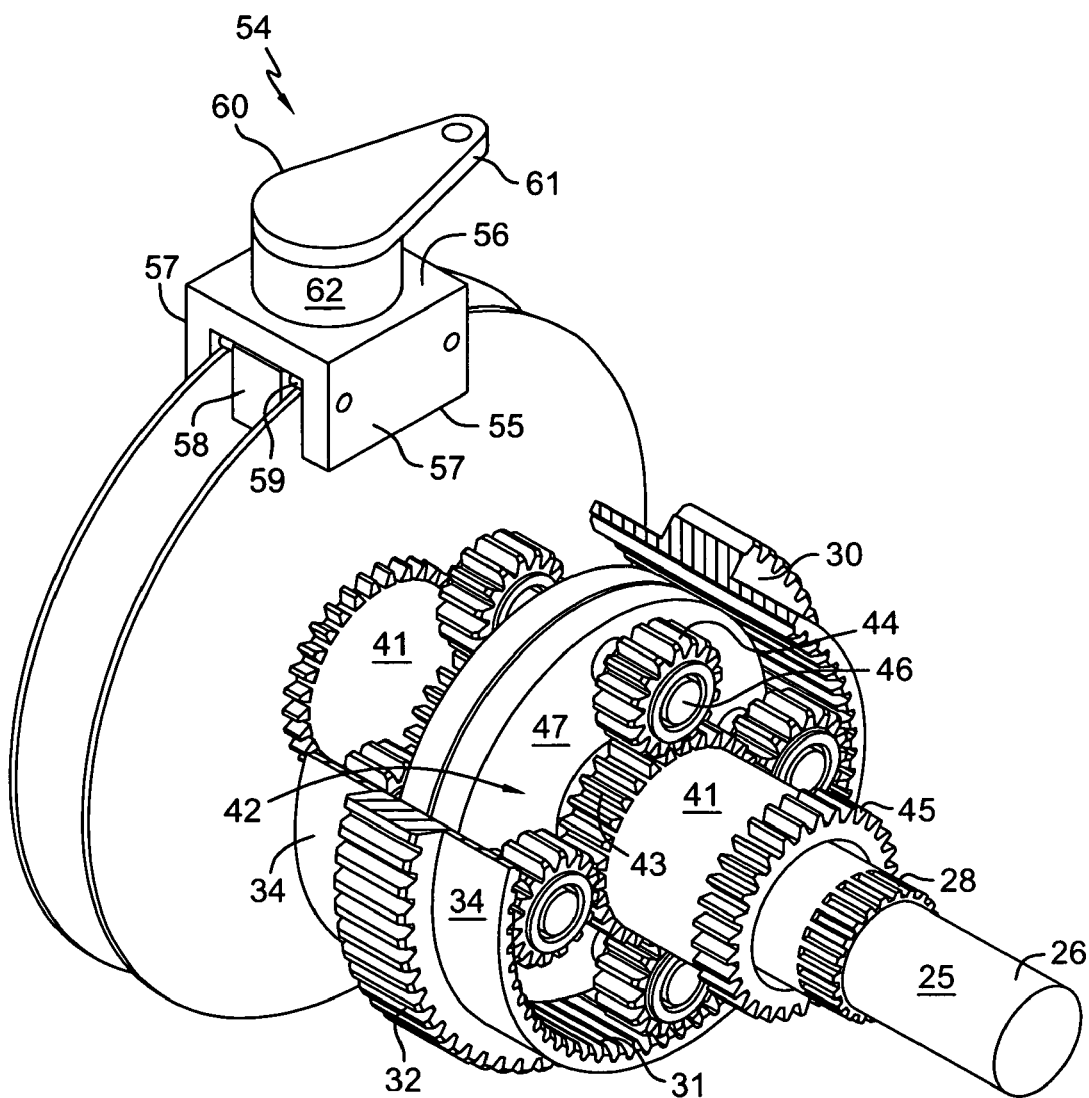
FIG. 3 depicts the perspective view as seen in FIG. 2 with several elements omitted for clarity.

FIG. 2 depicts a perspective view of an exemplary embodiment of the present invention. As shown in FIG. 2, and in more detail in FIGS. 3–6, the depicted embodiment of the present invention involves two brake-clutch assemblies 20 and 22. For convenience, only the elements of assembly 22 are described herein in detail. It will be appreciated by those in the art that the same descriptions will apply to the corresponding elements in assembly 20. It will likewise be understood that the embodiment depicted in FIG. 2 is merely exemplary and is not meant to be limiting. By way of example, axle 25, as set forth in detail below, may be engaged at each end to a separate output device, such as wheels 16, in which case assembly 20 would not be needed.

Ring gear 30 is located within and rotatable with respect to differential housing 35. As shown more clearly in FIG. 3, ring gear 30 has an input gear form 32 and support structures 34 extending from either side of input gear form 32. Ring gear 30 is supported by housing 35 at support structures 34. It will be appreciated that this is an exemplary embodiment, and ring gear 30 may be supported by other known means.

Axle 25, which has a first end 26, a second end 27 and a splined segment 28 therebetween, is located within and rotatable with respect to housing 35. Axle 25 extends through housing 35, and is drivingly engaged at first end 26 to an output device, such as wheels 16 or any other known output device. Axle 25 may be retained in housing 35 by a variety of techniques. For example, one or more washers may be positioned between the shoulder of spline 28 and an interior portion of housing 35. Alternatively, a snap ring may be used to locate and retain axle 25 within housing 35. As there are a number of retention methods, and those methods are unrelated to the present invention, they are not detailed herein.

Brake-clutch assembly 22 is disposed about axle 25 within housing 35. Brake-clutch assembly 22 comprises drive plate 50, brake plate 52, engagement assembly 54, which is located proximate to drive plate 50 and brake plate 52, and planetary gear arrangement 42, which is disposed about second end 27 of axle 25.

Planetary gear arrangements are generally well known in the art, and will only briefly be described herein. For a more detailed description of a known planetary gear design, see commonly assigned U.S. Pat. No. 5,782,717, which is incorporated herein by reference. As shown most clearly in FIGS. 1 and 3, planetary gear arrangement 42 comprises sun gear 43 and a plurality of planet gears 44 symmetrically disposed about sun gear 43. Planet gears 44 are mated to and driven by interior gear form 31 of ring gear 30. Four planet gears 44 are shown in the embodiment depicted in FIG. 3, but any number of planet gears may be utilized so long as the number and arrangement of such gears is sufficient to meet the loading requirements of brake-clutch assembly 22. Gear arrangement 42 also comprises a spur gear 45, which is engaged to sun gear 43. In the embodiment depicted, spur gear 45 and sun gear 43 are formed as a unitary component, as both gears are formed on opposite ends of sleeve 41. Other constructions may be used within the spirit of this invention.

Each planet gear 44 is rotatably mounted on a corresponding pin 46 extending from planet gear carrier 47. Planet gear carrier 47 is splined to and supported by axle 25, such that planet gear carrier 47 and axle 25 rotate at the same rate.

Drive plate 50 is mounted on and driven by spur gear 45 and drive plate 50 is axially slidable with respect to spur gear 45.

Brake plate 52 is mounted on and driven by splined portion 28 of axle 25 so that brake plate 52 is axially slidable with respect to splined portion 28.

Engagement assembly 54 is disposed about drive plate 50 and brake plate 52. In the depicted embodiment, engagement assembly 54 comprises engagement block 55, slider block 58 and control arm 60. Engagement block 55 is mounted to housing 35 through fasteners (not shown) and has a top side 56 and two side walls 57 extending therefrom, and at least one rail 59 positioned between the two side walls 57. Engagement block 55 is positioned such that portions of drive plate 50 and brake plate 52 are disposed between respective interior portions of side walls 57 and a portion of slider block 58. Slider block 58 is disposed on rail 59 and is slidable between any one of three positions; neutral, drive and brake. Each of the three positions will be described in more detail below.

Control arm 60 comprises handle member 61 integrally formed with shaft 62, and shaft 62 extends through top side 56 of engagement assembly 54 to engage slider block 58. Handle member 61 of control arm 60 may be coupled with control handle 17 through a known means, such as a cable. Therefore, the position of slider block 58 may be actuated by manipulating the corresponding control handle 17. The engagement of shaft 62 with slider block 58 is by way of a cam (not shown) formed on the end of shaft 62 that engages slider block 58. As cams and cable connections are known in the art, the details of these items are not shown.

Ring gear 30 is driven by gear train 23, which is powered by motor output shaft 24. As hydraulic motors are generally well known in the art, the details of motor 15 are not disclosed herein. For an example of a hydraulic motor, see commonly owned U.S. Pat. No. 5,201,692, which is incorporated herein by reference. As ring gear 30 rotates, it will drive each of planet gears 44. When slider block 58 is in the neutral position, the resistance of the axle shaft to movement by contact with the ground causes rotation of gear 30 to be freely communicated through planets 44 into sun gear 43, which freely rotates with respect to axle shaft 25 and housing 35.

Figure 5:
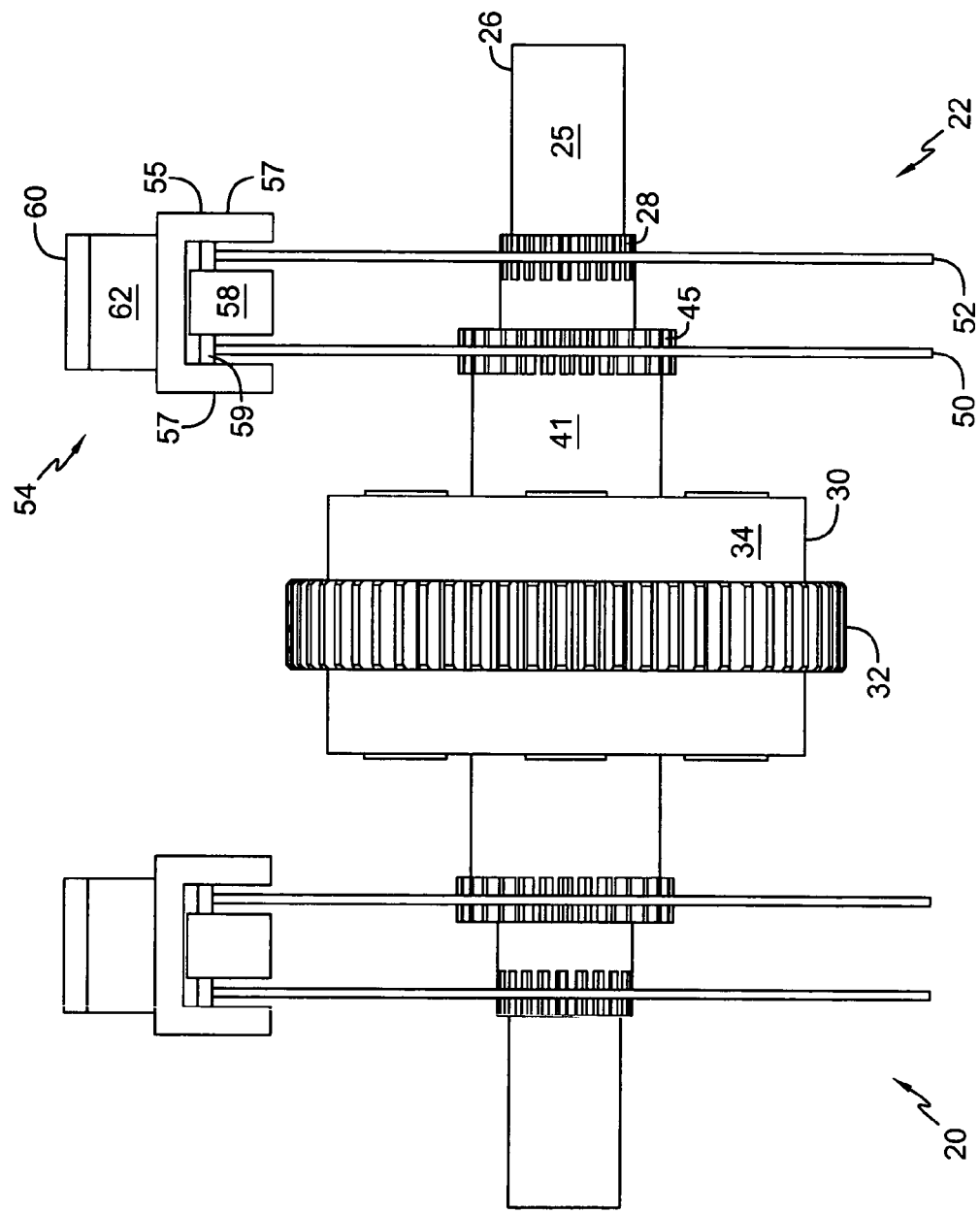
FIG. 5 depicts a front-end view of an embodiment of the present invention in the neutral position, as more fully described below.
Figure 6:
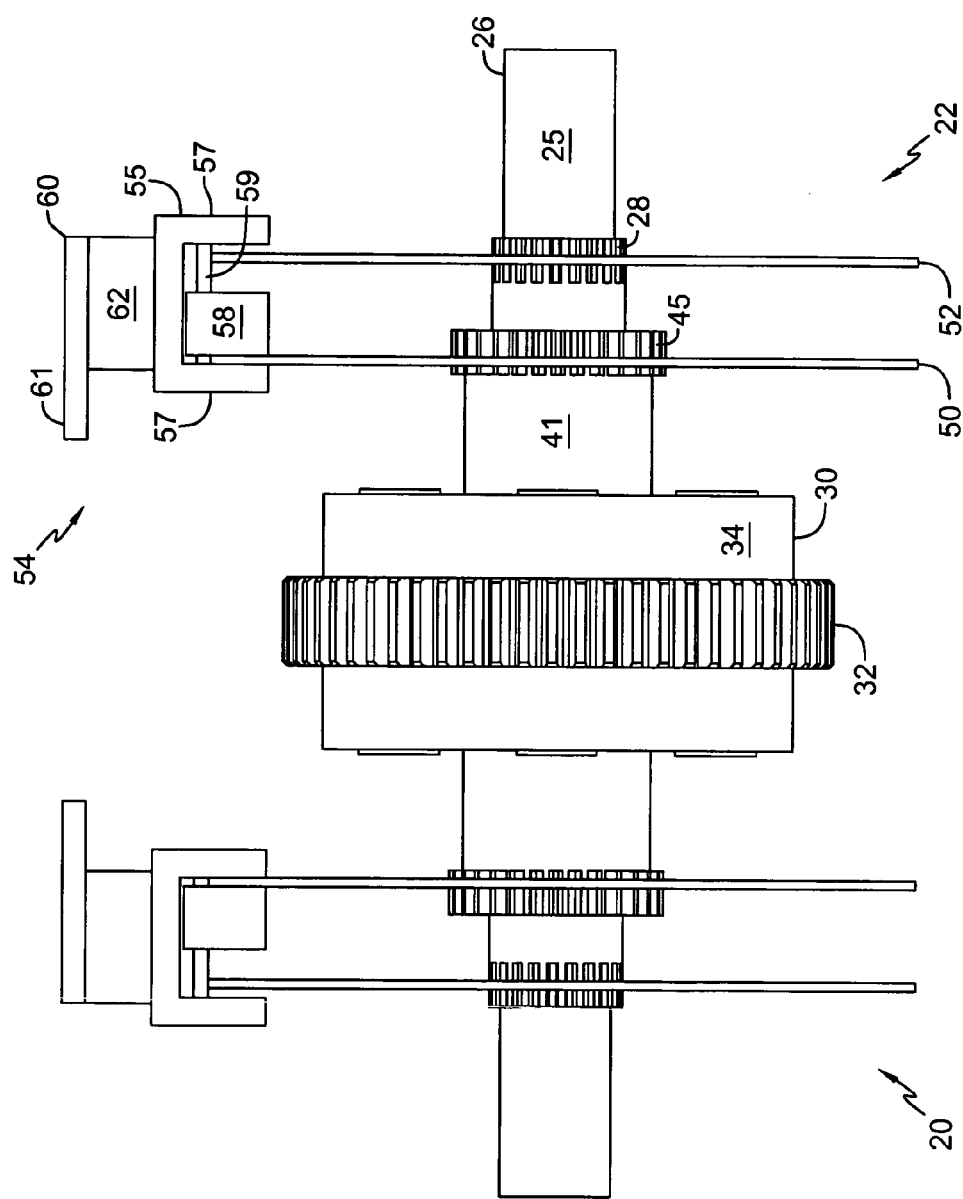
FIG. 6 depicts a front-end view of an embodiment of the present invention in the drive position, as more fully described below.

When slider block 58 is not engaged with either drive plate 50 or brake plate 52, it is in the neutral position, as depicted in FIG. 5. In this position, both drive plate 50 and brake plate 52 are free to rotate with respect to housing 35. Moving slider block 58 from the neutral position toward drive plate 50 moves slider block 58 into the drive position, as depicted in FIG. 6. In the drive position, frictional forces acting between engagement block 55 and slider block 58 will prevent rotation of drive plate 50. Because drive plate 50 is splined to spur gear 45, spur gear 45, which is connected to sun gear 43, will likewise be prevented from rotating with respect to housing 35. With slider block 58 in the drive position, ring gear 30 will drive each of planet gears 44. Because sun gear 43 is not free to rotate, planet gears 44 will now be forced to rotate about stationary sun gear 43. The rotation of planet gears 44 about stationary sun gear 43 will in turn cause planet gear carrier 47 to rotate, thereby driving axle 25.

Figure 4:
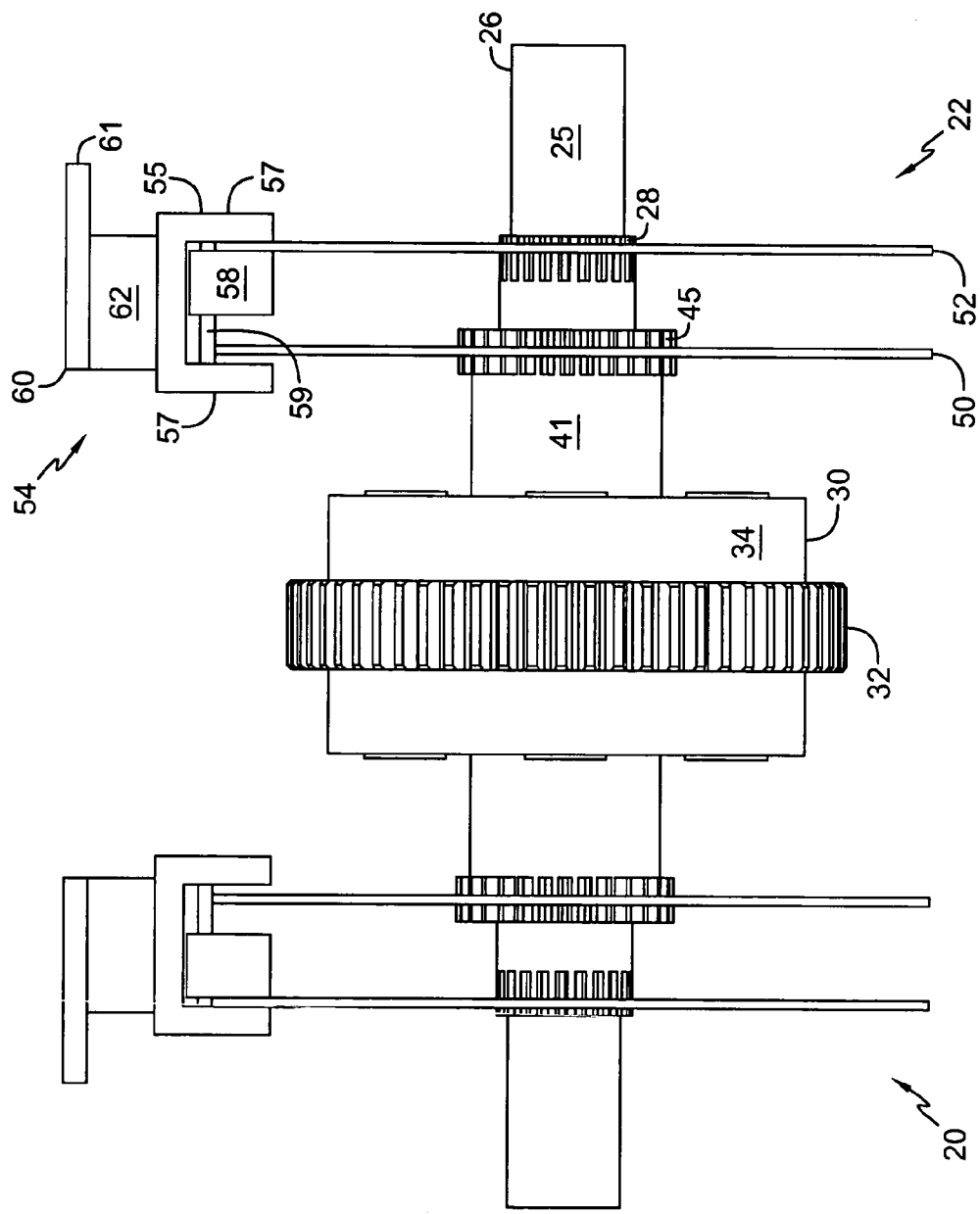
FIG. 4 depicts a front-end view of an embodiment of the present invention in the brake position, as more fully described below.

Moving slider block 58 from the drive position toward brake plate 52 moves slider block into the brake position as depicted in FIG. 4. When slider block 58 is in the brake position, frictional forces acting between engagement block 55 and slider block 58 will prevent brake plate 52 from rotating with respect to housing 35. Because brake plate 52 and planet gear carrier 47 rotate at the same rate, due to both being splined to axle 25, planet gear carrier 47 will not be able to rotate with respect to housing 35. Because of this, with rotation of gear 30 planet gears 44 will rotate in place, driving sun gear 43 about stationary axle shaft 25.

While specific embodiments of the invention have been described in detail, it will be appreciated by those skilled in the art that various modifications and alternatives to those details could be developed in light of the overall teachings of the disclosure. Accordingly, the particular arrangements disclosed herein are meant to be illustrative only and not limiting as to the scope of the invention which is to be given the full breadth of the appended claims and any equivalents thereof.

What is claimed is:

1. A drive apparatus comprising:
    a housing having a first and second axle and a ring gear located therein;
    a first brake clutch assembly located within the housing and comprising:
        a first planetary gear arrangement disposed about the first axle and driven by the ring gear;
        a first drive plate engaged to the first planetary gear arrangement;
        a first brake plate mounted on the first axle; and
        a first engagement assembly disposed about the first drive plate and the first brake plate, wherein the first engagement assembly selectively engages the first drive plate to prevent the first drive plate from rotating with respect to the housing, and wherein the first engagement assembly alternatively engages the first brake plate to prevent the first brake plate and the first axle from rotating with respect to the housing;
    a second brake clutch assembly located within the housing and comprising:
        a second planetary gear arrangement disposed about the second axle and driven by the ring gear;
        a second drive plate engaged to the second planetary gear arrangement;
        a second brake plate engaged to the second axle; and
        a second engagement assembly disposed about the second drive plate and the second brake plate, wherein the second engagement assembly selectively engages the second drive plate to prevent the second drive plate from rotating with respect to the housing, and wherein the second engagement assembly alternatively engages the second brake plate to prevent the second brake plate and the second axle from rotating with respect to the housing.

2. The drive apparatus as set forth in claim 1, wherein the ring gear comprises an input gear form, support structures extending from the input gear form and an interior gear form.

3. The drive apparatus as set forth in claim 1, wherein the first planetary gear arrangement comprises:
    a first planet gear carrier splined to the first axle;
    a first plurality of planet pins integrally formed on the first planet carrier;
    a first plurality of planet gears engaged to the interior gear form of the ring gear, wherein each of the planet gears is rotatably mounted on a planet pin;
    a first sun gear; and
    a first spur gear engaged to the first sun gear such that the first sun gear and the first spur gear rotate at the same rate.

4. The drive apparatus as set forth in claim 3, wherein the first drive plate is mounted on the first spur gear such that that first spur gear and the first drive plate rotate at the same rate.

5. The drive apparatus as set forth in claim 4, wherein the first engagement assembly comprises:
    a first engagement block having a first top side and two first side walls extending therefrom;
    a first at least one rail positioned between the first side walls;
    a first slider block slidably disposed on the first at least one rail; and
    a first control arm having a first handle member and a first shaft extending from the first handle member through the first top side, wherein the first shaft engages the first slider block such that rotation of the first handle member will slide the first slider block.

6. The drive apparatus as set forth in claim 3, wherein the second planetary gear arrangement comprises:
   a second planet gear carrier splined to the second axle;
   a second plurality of planet pins integrally formed on the second planet carrier;
   a second plurality of planet gears engaged to the interior gear form of the ring gear, wherein each of the planet gears is rotatably mounted on a planet pin;
   a second sun gear; and
   a second spur gear engaged to the second sun gear such that the second sun gear and the second spur gear rotate at the same rate.

7. The drive apparatus as set forth in claim 6, wherein the second drive plate is mounted on the second spur gear such that the second spur gear and the second drive plate rotate at the same rate.

8. The drive apparatus as set forth in claim 7, wherein the second engagement assembly comprises:
   a second engagement block having a second top side and two second side walls extending therefrom;
   a second at least one rail positioned between the second side walls;
   a second slider block slidably disposed on the second at least one rail; and
   a second control arm having a second handle member and a second shaft extending from the second handle member through the second top side, wherein the second shaft engages the second slider block such that rotation of the second handle member will slide the second slider block.

9. A brake clutch assembly comprising:
   a planetary gear assembly driven by an outside force and disposed about an axle;
   a drive plate engaged to the planetary gear assembly;
   a brake plate mounted on the axle such that the brake plate and the axle rotate at the same rate; and
   an engagement assembly located about the drive plate and the brake plate, wherein the engagement assembly selectively engages the drive plate to prevent the drive plate from rotating, and wherein the engagement assembly alternatively engages the brake plate to prevent the brake plate and the axle from rotating.

10. The brake clutch assembly of claim 9, wherein the brake clutch assembly is located within a drive apparatus having a housing.

11. The brake clutch assembly of claim 10, wherein the planetary gear assembly comprises:
    a ring gear having an input gear form and an interior gear form;
    a planet gear carrier splined to the axle;
    a plurality of planet pins integrally formed from the planet gear carrier;
    a plurality of planet gears mated with the interior gear form of the ring gear, each of the planet gears rotatably mounted on a planet pin;
    a sun gear mated with each of the planet gears; and
    a spur gear engaged with the sun gear such that that spur gear and the sun gear rotate at the same rate.

12. The brake clutch assembly of claim 11, wherein the drive plate is mated with the spur gear such that the drive plate and the spur gear rotate at the same rate.

13. The brake clutch assembly of claim 9, wherein the engagement assembly comprises:
    an engagement block having a top side and two side walls extending therefrom;
    at least one rail positioned between the side walls;
    a slider block slidably disposed on the at least one rail; and
    a control arm having:
       a handle member; and
       a shaft that extends through the top side of the engagement block and engages the slider block such that rotation of the handle member will slide the slider block along the at least one rail, the shaft extending from the handle member.

14. A drive apparatus for use in a vehicle, the drive apparatus comprising:
    a housing having an axle located therein;
    a ring gear having an input gear form and an interior gear form, wherein the ring gear is disposed within the housing;
    a brake clutch assembly located within the housing and comprising:
       a planetary gear arrangement disposed about the axle and driven by the ring gear, the planetary gear arrangement comprising a planet gear carrier splined to the axle, a plurality of planet pins integrally formed on the planet carrier, a plurality of planet gears engaged to the interior gear form of the ring gear, wherein each of the planet gears is rotatably mounted on a planet pin, a sun gear, and a spur gear engaged to the sun gear such that the sun gear and the spur gear rotate at the same rate;
       a drive plate engaged to the spur gear such that the spur gear and the drive plate rotate at the same rate; and
       an engagement assembly disposed about the drive plate, wherein the engagement assembly selectively engages the drive plate to prevent the drive plate from rotating with respect to the housing.

15. The drive apparatus as set forth in claim 14, wherein the brake clutch assembly further comprises a brake plate splined to the axle such that the brake plate and the axle rotate at the same rate.

16. The drive apparatus as set forth in claim 15, wherein the engagement assembly alternately engages the brake plate to prevent the brake plate and the axle from rotating with respect to the housing.

17. A drive apparatus comprising:
    a housing having an axle and a ring gear located therein;
    a brake clutch assembly located within the housing and comprising:
       a planetary gear arrangement disposed about the axle and driven by the ring gear;
       a drive plate engaged to the first planetary gear arrangement;
       a brake plate mounted on the first axle; and
       an engagement assembly disposed about the drive plate and the brake plate, wherein the engagement assembly selectively engages the drive plate to prevent the drive plate from rotating with respect to the housing, and wherein the engagement assembly alternatively engages the brake plate to prevent the brake plate and the axle from rotating with respect to the housing.

18. The drive apparatus as set forth in claim 17, wherein the ring gear comprises an input gear form, support structures extending from the input gear form and an interior gear form.

19. The drive apparatus as set forth in claim 18, wherein the planetary gear arrangement comprises:
    a planet gear carrier splined to the axle;
    a plurality of planet pins integrally formed on the planet carrier;

a plurality of planet gears engaged to the interior gear form of the ring gear, wherein each of the planet gears is rotatably mounted on a planet pin;

a sun gear; and a spur gear engaged to the sun gear such that the sun gear and the spur gear rotate at the same rate.

20. The drive apparatus as set forth in claim 19, wherein the drive plate is mounted on the spur gear such that that spur gear and the drive plate rotate at the same rate.

21. The drive apparatus as set forth in claim 20, wherein the engagement assembly comprises:

an engagement block having a top side and two side walls extending therefrom;

at least one rail positioned between the side walls;

a slider block slidably disposed on the at least one rail; and a control arm having a handle member and a shaft extending from the handle member through the top side, wherein the shaft engages the slider block such that rotation of the handle member will slide the slider block.

\* \* \* \* \*